US011787882B2

(12) United States Patent
Otsubo et al.

(10) Patent No.: US 11,787,882 B2
(45) Date of Patent: *Oct. 17, 2023

(54) ULTRAHIGH MOLECULAR WEIGHT PROPYLENE (CO)POLYMER

(71) Applicants: SunAllomer Ltd., Tokyo (JP); SHOWA DENKO K.K., Tokyo (JP)

(72) Inventors: Akihiro Otsubo, Kanagawa (JP); Akihiro Kamimura, Kanagawa (JP)

(73) Assignee: RESONAC CORPORATION, Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 17/619,387

(22) PCT Filed: Jun. 12, 2020

(86) PCT No.: PCT/JP2020/023195
§ 371 (c)(1),
(2) Date: Dec. 15, 2021

(87) PCT Pub. No.: WO2020/255872
PCT Pub. Date: Dec. 24, 2020

(65) Prior Publication Data
US 2022/0363788 A1 Nov. 17, 2022

(30) Foreign Application Priority Data

Jun. 17, 2019 (JP) .................................. 2019-111940

(51) Int. Cl.
| C08F 10/06 | (2006.01) |
| C08F 4/642 | (2006.01) |
| C08F 110/06 | (2006.01) |
| C08F 210/06 | (2006.01) |
| C08F 210/16 | (2006.01) |

(52) U.S. Cl.
CPC ............ *C08F 10/06* (2013.01); *C08F 4/6421* (2013.01); *C08F 2410/01* (2013.01)

(58) Field of Classification Search
CPC ...... C08F 10/06; C08F 4/6421; C08F 110/06; C08F 210/06; C08F 210/16
See application file for complete search history.

(56) References Cited

U.S. PATENT DOCUMENTS

| 3,705,123 A | 12/1972 | Mahlman et al. |
| 6,271,310 B1 | 8/2001 | Okayama et al. |
| 6,437,048 B1 | 8/2002 | Saito et al. |
| 8,916,644 B2 | 12/2014 | Tamura et al. |
| 9,522,984 B2 | 12/2016 | Kaneno et al. |
| 2001/0049425 A1 | 12/2001 | Waymouth et al. |
| 2006/0116280 A1 | 6/2006 | Yabunouchi et al. |
| 2009/0155567 A1 | 6/2009 | Sugawara et al. |
| 2011/0269900 A1 | 11/2011 | Tamura et al. |
| 2015/0266981 A1 | 9/2015 | Mignogna et al. |
| 2022/0177686 A1 | 6/2022 | Yokoyama et al. |

FOREIGN PATENT DOCUMENTS

| CN | 1196066 A | 10/1998 |
| CN | 1252825 A | 5/2000 |
| CN | 1735632 | 2/2006 |
| CN | 101090933 A | 12/2007 |
| CN | 101189269 A | 5/2008 |
| CN | 102272208 A | 12/2011 |
| EP | 1813643 A1 | 1/2007 |
| EP | 3985034 A1 | 4/2022 |
| JP | 5-293821 | 11/1993 |
| JP | 6-057055 | 3/1994 |
| JP | 3023382 | 3/2000 |
| JP | 2013-100491 A | 5/2013 |
| JP | 5653761 | 11/2014 |
| JP | 5979985 | 8/2016 |
| JP | 6144045 | 6/2017 |
| JP | 6144045 B2 * | 6/2017 |
| WO | WO199720869 | 6/1997 |
| WO | WO2010079799 | 7/2010 |

OTHER PUBLICATIONS

Machine translation of JP 6144045B2. (Year: 2017).*
International Search Report issued in PCT/JP2020/023195 dated Aug. 11, 2020.
Plastic Age, Mar. 1990, vol. 36, pp. 137-144.
Filiatrault, D., et al., Intrinsic Viscosities and Huggins' Constant for Ethylene-Propylene Copolymers. 2. Effect of the Steric Hindrance of the Solvent on the Solvent Quality. Viscosities in Branched Alkanes, Gycloalkanes, Tetraalkyltin Compounds, cis- and trans-Bicyclo [4.4.0] decane, and Tetrahydronaphthalene, Macromolecules, 1979, vo., 12, No. 1, pp. 69-74, table II.
Chinese First Office Action for Chinese Application No. 202080043566. 6, dated Jan. 9, 2023, 11 pages with translation.
International Preliminary Report on Patentability received for PCT Patent Application No. PCT/JP2020/023195, dated Dec. 30, 2021, 12 pages. (7 pages of English Translation and 5 pages of Original Document).
International Search Report and Written Opinion received for PCT Patent Application No. PCT/JP2020/023195, dated Aug. 11, 2020, 16 pages. (7 pages of English Translation and 9 pages of Original Document).
International Preliminary Report on Patentability received for PCT Patent Application No. PCT/JP2020/023196, dated Dec. 30, 2021, 10 pages. (6 pages of English Translation and 4 pages of Original Document).
International Search Report and Written Opinion received for PCT Patent Application No. PCT/JP2020/023196, dated Aug. 11, 2020, 12 pages. (5 pages of English Translation and 7 pages of Original Document).
Office Action received for Chinese Patent Application No. 202080043566.6, dated Jan. 9, 2023, 11 pages (5 pages of English Translation and 6 pages of Original Document).

(Continued)

*Primary Examiner* — Catherine S Branch
(74) *Attorney, Agent, or Firm* — Workman Nydegger

(57) ABSTRACT

Provided is a propylene homopolymer or a copolymer of propylene and a 30 wt % or less α-olefin having 2 or 4 to 8 carbon atoms, having a intrinsic viscosity of more than 20 dl/g, as measured in a tetralin solvent at 135° C.

6 Claims, No Drawings

(56) References Cited

OTHER PUBLICATIONS

Office Action received for Chinese Patent Application No. 202080043574, dated Nov. 22, 2022, 16 pages (8 pages of English Translation and 8 pages of Original Document).
Machat et al., "Ultrarigid Indenyl-based Hafnocene Complexes for the Highly Isoselective Polymerization of Propene: Tunable Polymerization Performance Adopting Various Sterically Demanding 4-Aryl Substituents," Organometallics, (2017) pp. 399-408.
European Extended Search Report and Opinion for European Application No. 20827414.2, dated May 17, 2023, 8 pages.
European Extended Search Report and Opinion for European Application No. 20826158.6, dated May 17, 2023, 11 pages.

* cited by examiner

ULTRAHIGH MOLECULAR WEIGHT PROPYLENE (CO)POLYMER

TECHNICAL FIELD

The present invention relates to an ultrahigh molecular weight propylene (co)polymer.

BACKGROUND ART

A high molecular weight propylene polymer is useful as a resin component particularly for an extrusion molded body (general sheet, foamed sheet, blow molded article, etc.), and various studies have been made so far on production of the high molecular weight propylene polymer. For example, PTL 1 discloses a crosslinked ultrahigh molecular weight olefin-based polymer having a intrinsic viscosity [η] of 5 to 50 dl/g, as measured in a decalin solvent at 135° C. However, the olefin-based polymers specifically disclosed in the examples is only polyethylene. PTL 2 discloses an ultrahigh molecular weight propylene homopolymer having a intrinsic viscosity [η] of 7 dl/g or more and less than 25 dl/g, as measured using a decalin solution. Examples of this literature disclose a propylene polymer having [η] of 20.2 dl/g. PTL 3 discloses an ultrahigh molecular weight polypropylene having a intrinsic viscosity [η] of at least 5 dl/g or more, as measured using a decalin solution. Examples of this literature disclose polypropylene having [η] of 20.25 dl/g. PTL 4 discloses polypropylene having a intrinsic viscosity [η] of 5 to 20 dl/g, as measured in a tetrahydronaphthalene (tetralin) solvent at 135° C.

CITATION LIST

Patent Literature

PTL 1: JP 5979985 B2
PTL 2: JP 5653761 B2
PTL 3: JP 3023382 B2
PTL 4: JP 6144045 B2

SUMMARY OF INVENTION

Technical Problem

PTL 1 does not specifically disclose a propylene polymer having a high [η]. PTLs 2 and 3 disclose propylene polymers having [η] of about 20 dl/g, but the viscosities are values measured using decalin as a solvent. When a value of [η] measured using decalin as a solvent is converted into a value measured using tetralin as a solvent, it is obvious to those skilled in the art that the converted value is lower. Therefore, when values of [η] described in PTLs 2 and 3 are converted into values measured using tetralin as a solvent, the converted values are less than 20 dl/g. From the above, an ultrahigh molecular weight propylene polymer having a [η] of more than 20 dl/g, as measured using tetralin as a solvent, has not been reported so far. In view of such circumstances, an object of the present invention is to provide an ultrahigh molecular weight propylene polymer.

Solution to Problem

The inventors have found that an ultrahigh molecular weight polypropylene-based polymer can be produced by optimizing a polymerization catalyst and polymerization conditions, and have completed the present invention. That is, the above problem is solved by the following present invention.

[1] A propylene homopolymer or a copolymer of propylene and a 30 wt % or less α-olefin having 2 or 4 to 8 carbon atoms, having a intrinsic viscosity of more than 20 dl/g, as measured in a tetralin solvent at 135° C.

[2] The copolymer according to [1], in which the α-olefin is ethylene.

[3] The copolymer according to [2] having a value of the intrinsic viscosity of 23 dl/g or more and a content of the ethylene of 3 to 30 wt %.

[4] The copolymer according to [2] or [3] having a melting point determined using a differential scanning calorimeter (DSC) at a heating rate of 10° C./min, in which the melting point, Tm (° C.), of the copolymer and the content of the ethylene in the copolymer, C2 (wt %), satisfy formula (1) below:

$$Tm \geq -3.4 \times C2 + 162 \quad (1)$$

[5] A method for producing the polymer according to any one of [1] to [4], including the polymerization of a corresponding monomer using a catalyst to prepare the polymer, in which the catalyst contains:
(A) a solid catalyst containing magnesium, titanium, halogen, and an electron donor compound as essential components;
(B) an organoaluminum compound; and
(C) an external electron donor compound as necessary.

[6] A polypropylene-based resin composition containing the polymer according to any one of [1] to [4], wherein a content of the polymer is 0.1 to 20 wt % with respect to a total weight of resin components constituting the composition.

Advantageous Effects of Invention

According to the present invention, an ultrahigh molecular weight propylene polymer can be provided.

DESCRIPTION OF EMBODIMENTS

Hereinafter, the present invention will be described in detail. In the present invention, "X to Y" include the end values X and Y.

1. Propylene (Co)Polymer (1) Intrinsic Viscosity

A propylene homopolymer or a copolymer of propylene and a 30 wt % or less α-olefin having 2 or 4 to 8 carbon atoms (hereinafter, also collectively referred to as a "propylene (co)polymer") of the present invention has a intrinsic viscosity of more than 20 dl/g, as measured in a tetralin solvent at 135° C. The intrinsic viscosity is an indicator of molecular weight, and the propylene (co)polymer of the present invention has an unconventionally and extremely high molecular weight. A resin composition containing the propylene (co)polymer having a high intrinsic viscosity also has a high melt tension, and therefore provides, for example, an excellent foam. From the above viewpoint, the lower limit of the intrinsic viscosity is preferably 23 dl/g or more. From the viewpoint of ease of production, the upper limit of the intrinsic viscosity is preferably 50 dl/g or less.

(2) Comonomer Amount

When the propylene (co)polymer of the present invention is a copolymer, the amount of a comonomer is 30 wt % or less. When the amount of the comonomer exceeds this value, the crystallinity of the copolymer decreases and the powder properties of the polymer deteriorate, so that the production becomes difficult. From the above viewpoint, the upper limit of the amount of the comonomer is preferably 25 wt % or less. On the other hand, the lower limit of the amount of the comonomer is not limited, and is preferably 3 wt % or more, and more preferably 5 wt % or more. The amount of the comonomer is the amount of units derived from the relevant monomer in the copolymer. The comonomer includes α-olefin having 2 or 4 to 8 carbon atoms. Among them, an α-olefin having 2 carbon atoms, that is, ethylene is preferable as the comonomer from the viewpoint of reactivity. By copolymerizing ethylene, the intrinsic viscosity of the propylene polymer can be further increased. Therefore, in one aspect, the propylene (co)polymer of the present invention is a copolymer in which the intrinsic viscosity is 23 dl/g or more and the content of ethylene (content percentage of ethylene-derived units) is 3 to 30 wt %.

(3) XI

The propylene (co)polymer of the present invention has a xylene-insoluble fraction (XI) of preferably 40 wt % or more, more preferably 50 wt % or more, still more preferably 60 wt % or more, and particularly preferably 70 wt % or more. The XI is a crystalline component in the propylene (co)polymer. The upper limit of the XI is not particularly limited.

(4) Melting Point

The propylene (co)polymer of the present invention has a melting point (Tm) of preferably 100° C. or higher, more preferably 120° C. or higher, still more preferably 140° C. or higher, and particularly preferably 150° C. or higher. The melting point is a temperature at which the heat of fusion associated with melting observed by second scanning using a differential scanning calorimeter (DSC) exhibits a maximum value. The second scanning means that a sample (resin) is heated and melted, then cooled to be crystallized, held at room temperature for 5 minutes, and then subjected to second heating to perform thermal analysis. Specifically, the sample is heated to a melting temperature or higher (230° C.), held at the temperature for 5 minutes, cooled to 30° C. at a cooling rate of 10° C./min, held for 5 minutes, and then heated to 230° C. at a heating rate of 10° C./min to perform thermal analysis.

The propylene (co)polymer of the present invention has a characteristic of having a high melting point compared with a conventional copolymer having the same type and content of a comonomer as those of the propylene (co)polymer. Particularly, when the propylene (co)polymer of the present invention is a propylene-ethylene copolymer, the Tm (° C.) and the content of ethylene in the copolymer, C2 (wt %), preferably satisfy formula (1).

$$Tm \geq -3.4 \times C2 + 162 \qquad \text{Formula (1):}$$

(5) Properties, etc.

From the viewpoint of handleability and the like, the propylene (co)polymer of the present invention is preferably a powder. The powder more preferably has a powder fluidity of 3.5 or less. The powder fluidity is the fluidity of a powdery polymer produced in a polymerization reactor, and is an indicator of the production stability of the polymer. Specifically, the powder fluidity is a value obtained by quantifying the ease of flowing of a powder, which is evaluated as follows: a constant load is applied to the powder placed on a substrate at a constant temperature for a constant time; the load is removed; and the substrate is inclined; and the fluidity is evaluated. As the value of the powder fluidity is lower, the powder fluidity is better, and the production stability is also better. The powder fluidity of the propylene (co)polymer of the present invention is preferably 3.5 or less, more preferably 3.0 or less, and still more preferably 2.0 or less.

The powder fluidity is measured by the following method.

A frame having an opening of 5 cm long×5 cm wide×1 cm high is placed on a metal substrate (first substrate), and 5 g of a polymer as a sample is spread within the frame. A second substrate is placed on the frame so that the pressure applied to the sample is uniformly 23 g/cm². The sample within the frame is held at 70° C. for 20 minutes, then the frame and the second substrate are removed, and the first substrate on which the sample is placed is inclined, thereby evaluating the degree of collapse of the sample according to the following criteria.

1. When inclined to 0° or more and less than 30°, the whole amount collapses.
2. When inclined to 30° or more and less than 50°, the whole amount collapses.
3. When inclined to 50° or more and less than 70°, the whole amount collapses.
4. When inclined to 70° or more and less than 90°, the whole amount collapses.
5. The whole amount does not collapse even when inclined to 90° or more.

The first substrate and the second substrate are preferably made of stainless steel from the viewpoint of heat conductivity and rust prevention property for repeated use. In addition, for the first substrate, the surface roughness (maximum roughness, Ry) is preferably 1 μm or less in order to eliminate the influence of friction with a powder.

2. Production Methods

The propylene (co)polymer of the present invention is preferably produced by using a catalyst containing (A) a solid catalyst containing magnesium, titanium, halogen, and an electron donor compound as essential components, (B) organoaluminum compound, and as necessary, (C) an external electron donor compound.

(1) Solid Catalyst (Component (A))

A component (A) can be prepared by a known method of, for example, bringing a magnesium compound, a titanium compound, and an electron donor compound into mutual contact. As the titanium compound used for the preparation of the component (A), a tetravalent titanium compound represented by the general formula: $Ti(OR)_g X_{4-g}$ is suitable. In the formula, R is a hydrocarbon group, X is halogen, and $0 \leq g \leq 4$. Specific examples of the titanium compound include titanium tetrahalide such as $TiCl_4$, $TiBr_4$, and $TaI_4$; alkoxytitanium trihalide such as $Ti(OCH_3)Cl_3$, $Ti(OC_2H_5)Cl_3$, $Ti(O_n-C_4H_9)Cl_3$, $Ti(OC_2H_5)Br_3$, and $Ti(OisoC_4H_9)Br_3$; alkoxytitanium dihalide such as $Ti(OCH_3)_2Cl_2$, $Ti(OC_2H_5)_2Cl_2$, $Ti(O_n-C_4H_9)_2Cl_2$, and $Ti(OC_2H_5)_2Br_2$; trialkoxytitanium monohalide such as $Ti(OCH_3)_3Cl$, $Ti(OC_2H_5)_3Cl$, $Ti(O_n-C_4H_9)_3Cl$, and $Ti(OC_2H_5)_3Br$; and tetraalkoxytitanium such as $Ti(OCH_3)_4$, $Ti(OC_2H_5)_4$, and $Ti(O_n-C_4H_9)_4$. Among these titanium compounds, a halogen-containing titanium compound, particularly titanium tetrahalide is preferable, and titanium tetrachloride is particularly preferable.

Examples of the magnesium compound include magnesium compounds having a magnesium-carbon bond or a magnesium-hydrogen bond, such as dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, and butylmagnesium hydride. These magnesium compounds can be used, for example, in the form of a complex compound with organoaluminum or the like, and may be liquid or solid. Further, examples of a suitable magnesium compound include magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride, and octoxymagnesium chloride; aryloxymagnesium halides such as phenoxymagnesium chloride and methylphenoxymagnesium chloride; alkoxymagnesiums such as ethoxymagnesium, isopropoxymagnesium, butoxymagnesium, n-octoxymagnesium, and 2-ethylhexoxymagnesium; dialkoxymagnesiums such as dimethoxymagnesium, diethoxymagnesium, dipropoxymagnesium, dibutoxymagnesium, ethoxymethoxymagnesium, ethoxypropoxymagnesium, and butoxyethoxymagnesium; and aryloxymagnesiums such as phenoxymagnesium and dimethylphenoxymagnesium.

The above-mentioned electron donor compound is generally referred to as an "internal electron donor compound". In the present invention, the internal electron donor compound is preferably a compound having an ester moiety represented by Chemical Formula (I).

[Chemical Formula 1]

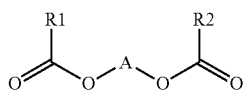

(I)

In Chemical Formula (I), R1 is independently a hydrogen atom or a hydrocarbon group having 1 to 15 carbon atoms. The hydrocarbon group may have a heteroatom such as halogen, P, S, N, O, or Si, and may form a ring. R2 is defined similarly to R1, but R2 and R1 do not need to have the same structure. Further, R1 and R2 may be linked to form a ring.

A is a divalent crosslinking group. The chain length between the crosslinking bonds is preferably 1 to 10 atoms. When A has a cyclic structure, the chain length refers to the number of atoms of the shortest sequence between the oxygen atoms to which A is bonded. A is preferably represented by —$(ZR^3{}_m)_n$—. Z is preferably C, Si, Ge, O, N, S, or P. One or more $R^3$'s are each independently hydrogen or a hydrocarbon group having 1 to 20 carbon atoms, and may contain the above-mentioned heteroatom, and a plurality of $R^3$'s may be fused to form one or more rings. m is a number corresponding to the valence of Z, and n is an integer of 1 to 10. For example, $R^3$ can form an aromatic ring, a heterocyclic ring, or an alicyclic ring together with Z. When —$(ZR^3{}_m)_n$— contains O, S, and N, these atoms are not directly bonded to the oxygen atoms of Chemical Formula (I).

In the present invention, it is more preferable to use a carbamate-based compound as the internal electron donor compound. The carbamate-based compound is a compound having a carbamic acid ester skeleton, and is represented by Chemical Formula (II).

[Chemical Formula 2]

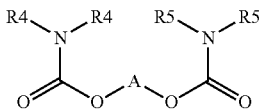

(II)

In Chemical Formula (II), R4's are independently a hydrogen atom or a hydrocarbon group having 1 to 15 carbon atoms. The hydrocarbon group may have a heteroatom such as halogen, P, S, N, O, or Si, and the two R4's may be linked to form a ring. R5 is defined similarly to R4, but R4 and R5 do not need to have the same structure.

A is defined as described above, and Z is preferably C or Si, and more preferably C. In particular, compounds having the following combinations are preferred.

A: a divalent aromatic group that may have a substituent. Examples of the aromatic group include a phenylene group and a naphthylene group. Examples of the substituent include linear or branched alkyl groups having 1 to 5 carbon atoms, such as a methyl group, an ethyl group, a propyl group, a butyl group, and a pentyl group.

R4 and R5: linear or branched alkyl groups having 1 to 5 carbon atoms, such as a methyl group, an ethyl group, a propyl group, a butyl group, and a pentyl group.

Specifically, compounds described in US 2015-0266981 A can be used as the compounds defined by Chemical Formula (II).

(2) Organoaluminum Compound (Component (B))

Examples of the organoaluminum compound include the following compounds:

trialkylaluminums such as triethylaluminum and tributylaluminum;

trialkenylaluminums such as triisoprenyl aluminum;

dialkylaluminum alkoxides such as diethylaluminum ethoxide and dibutylaluminum butoxide;

alkylaluminum sesquialkoxides such as ethyl aluminum sesquiethoxide and butyl aluminum sesquibutoxide;

partially halogenated alkylaluminums such as ethylaluminum dichloride, propylaluminum dichloride, butylaluminum dibromide, diethylaluminum chloride, dipropylaluminum chloride, and dibutylaluminum chloride;

partially hydrogenated alkyl aluminums such as dialkylaluminum hydrides including diethylaluminum hydride and dibutylaluminum hydride; alkyl aluminum dihydrides including ethyl aluminum dihydride and propyl aluminum dihydride; and partially alkoxylated and halogenated alkylaluminums such as ethylaluminum ethoxychloride, butylaluminum butoxychloride, and ethylaluminum ethoxybromide.

(3) Electron Donor Compound (Component (C))

The electron donor compound of the component (c) is also referred to as an "external electron donor compound". As the external electron donor compound, an organosilicon compound is preferable, and specific examples thereof include the following compounds:

trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, dicyclopentyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, thexyltrimethoxysilane, n-butyltriethoxysilane, iso-butyltriethoxysilane, phenyltriethoxysilane, γ-aminopropyltriethoxysilane, chlortriethoxysilane, ethyltriisopropoxysilane, vinyltributoxysilane, cyclohexyltrimethoxysilane, cyclohexyltriethoxysilane, 2-norbornane trimethoxysilane, 2-norbornane triethoxysilane, 2-norbornane methyl dimethoxysilane, ethyl silicate, butyl silicate, trimethylphenoxysilane, methyltriallyloxysilane, vinyltris(β-methoxyethoxysilane), vinyltriacetoxysilane, dimethyltetraethoxydisiloxane, methyl(3,3,3-trifluoro-n-propyl)dimethoxysilane, cyclohexylethyldimethoxysilane, cyclopentyl-t-butoxydimethoxysilane, diisobutyldimethoxysilane, isobutylisopropyldimethoxysilane, n-propyltrimethoxysilane, di-n-propyldimethoxysilane, thexyltrimethoxysilane, t-butylethyldimethoxysilane, t-butylpropyldimethoxysilane, t-butyl-t-butoxydimethoxysilane, isobutyltrimethoxysilane, cyclohexylisobutyldimethoxysilane, di-sec-butyldimethoxysilane, isobutylmethyldimethoxysilane, bis(decahydroisoquinoline-2-yl)dimethoxysilane, diethylaminotriethoxysilane, dicyclopentyl-bis(ethylamino)silane, tetraethoxysilane, tetramethoxysilane, and isobutyltriethoxysilane.

(4) Composition Ratio

The composition ratio among the components (A) to (C) is not limited, but the composition ratio between the component (A) and the component (B) is adjusted so that the Al/Ti molar ratio is preferably 10 to 1000 and more preferably 30 to 600; when the component (C) contains silicon, the composition ratio between the component (A) and the component (C) is adjusted so that the Si/Al molar ratio is preferably 0.01 to 1.5 and more preferably 0.05 to 1.0.

(5) Polymerization

One or more raw material monomers are brought into contact with the catalyst prepared as described above to perform polymerization. For this polymerization, pre-polymerization may be performed using the above-described catalyst. The pre-polymerization is a process of forming a polymer chain on a solid catalyst component, as a foothold for subsequent main polymerization of one or more raw material monomers. The pre-polymerization can be performed by a known method. The pre-polymerization is usually performed at 40° C. or lower, preferably 30° C. or lower, and more preferably 20° C. or lower. Then, the pre-polymerized catalyst (pre-polymerization catalyst) is introduced into a polymerization reaction system to perform the main polymerization of one or more raw material monomers. The polymerization may be carried out in a liquid phase, in a gas phase, or in a liquid-gas phase. The polymerization temperature is preferably 0 to 90° C., and more preferably 20 to 80° C. The polymerization pressure is preferably in the range of 0.8 to 6.0 MPa for the polymerization performed in a liquid phase, and preferably in the range of 0.5 to 3.0 MPa for the polymerization performed in a gas phase. In the present invention, a conventional molecular weight regulator known in the art, such as a chain transfer agent (e.g., hydrogen or $ZnEt_2$), can be used in a very small amount.

In addition, a polymerization reactor having a gradient in monomer concentration or polymerization conditions may be used. For such a reactor, for example, a reactor in which at least two polymerization zones are interconnected is used, and one or more monomers can be polymerized by gas phase polymerization. Specifically, in the presence of a catalyst, one or more monomers are supplied and polymerized in a polymerization zone composed of a riser, one or more monomers are supplied and polymerized in a downcomer connected to the riser, and a polymer product is collected while being circulated through the riser and downcomer. This method includes a unit for entirely or partially preventing a gas mixture present in the riser from entering the downcomer. In addition, a gas or liquid mixture having a different composition from the gas mixture present in the riser is introduced into the downcomer. As the above polymerization method, for example, a method described in Japanese Translation of PCT International Application Publication No. 2002-520426 can be applied.

3. Application

Since the propylene (co)polymer of the present invention has an extremely high molecular weight, a composition containing this polymer has a high melt tension and a die swell. Therefore, the propylene (co)polymer of the present invention is useful for applications of an extrusion molded article (general sheet, foamed sheet, blow molded article, etc.) and an injection molded article. In addition, the propylene (co)polymer of the present invention, which also has a characteristic of having crystallinity and being difficult to melt, is also useful as an organic filler. Therefore, the propylene (co)polymer of the present invention can be used singly, but can also be used in combination with another resin as an additive, an additional component, or the like to form a composition. As a method of addition, a known method such as melt kneading, solution blending, or polymerization blending by multistage polymerization can be used. Further, the composition can also be used as a master batch and combined with another polyolefin to produce a secondary composition.

When a composition containing a small amount of the propylene (co)polymer of the present invention is obtained by polymerization blending, the propylene (co)polymer of the present invention may be polymerized in the pre-polymerization stage. The content percentage of the propylene (co)polymer of the present invention in the composition is preferably 0.1 wt % or more, more preferably 0.5 wt % or more, and still more preferably 1 wt % or more with respect to the total weight of resin components constituting the composition. The upper limit is preferably 20 wt % or less, more preferably 15 wt % or less, and still more preferably 10 wt % or less. If the percentage of the propylene (co)polymer is less than 0.1 wt %, it is difficult to obtain expected processability and physical properties, and if the percentage exceeds 20 wt %, the fluidity of the composition may be reduced.

EXAMPLES

Example 1

Into a 300 mL 4-necked round-bottom flask purged with nitrogen, 45 mL of toluene and 10.0 g of fine spherical $Mg(OC_2H_5)_2$ were introduced at 5° C. While stirring, 28.7 ml of titanium tetrachloride was added dropwise over 10 minutes, and 11.3 mmol of 5(tertiary butyl)-3-methyl-1,2-phenylene bis(diethylcarbamate) (hereinafter, also referred to as compound a) was added thereto. The temperature was raised to 110° C. and held for 120 minutes. Stirring was then stopped, the solid product was allowed to settle, and the supernatant liquid was sucked out. Thereafter, the solid product was washed 4 times with toluene (75 mL) at 90° C.

To the washed solid, 50 ml of toluene was added, into which 21 ml of titanium tetrachloride was then added, the temperature was raised to 100° C., and the mixture was stirred for 90 minutes. Thereafter, stirring was stopped, the solid product was allowed to settle, and the supernatant liquid was sucked out. Then, the solid product was washed 6 times with heptane (75 mL) at 40° C. The washed solid was dried under reduced pressure to obtain 7.6 g of a solid catalyst component (A). The solid catalyst component contained 14.3 wt % of the compound a, 14.0 wt % of Mg, and 4.0 wt % of Ti.

The inside of an autoclave reactor with a stirrer and an internal volume of 20 L was sufficiently vacuum-dried and replaced with nitrogen. Into the reactor, 52.8 mg of the solid catalyst prepared, triethylaluminum (TEAL), and dicyclopentyldimethoxysilane (DCPMS) were fed in such amounts that the Al/Ti molar ratio was 150 and the Si/Al molar ratio was 0.2. Subsequently, 5.6 kg of propylene was added, the temperature of the autoclave was raised to 40° C., and polymerization was performed at 40° C. for 30 minutes. After completion of the polymerization reaction, the unreacted monomer was discharged to obtain 75 g of a propylene homopolymer, which was then evaluated. The results are shown in Table 1.

Examples 2 and 3

Polymerizations were each performed in the same manner as in Example 1 except that the Al/Ti molar ratio and the Si/Al molar ratio were changed, thus obtaining propylene homopolymers, which were then evaluated. The results are shown in Table 1. The Al/Ti molar ratio was changed by adjusting the amount of TEAL used. Hereinafter, the similar manner was carried out for changing the Al/Ti molar ratio.

Example 4

Polymerization was performed in the same manner as in Example 1 except that triisobutylaluminum (TIBAL) was used instead of TEAL, thus obtaining a propylene homopolymer, which was then evaluated. The results are shown in Table 1.

Examples 5 and 6

Polymerizations were each performed in the same manner as in Example 1 except that the polymerization temperature and the Si/Al molar ratio were changed, thus obtaining propylene homopolymers, which were then evaluated. The results are shown in Table 1.

Example 7

A propylene-ethylene copolymer was obtained in the same manner as in Example 1 except that 5 kg of propylene was added to the reactor, and polymerization was performed at 40° C. for 30 minutes while ethylene gas was continuously supplied during polymerization, thus adjusting the ethylene partial pressure to be constant; and the propylene-ethylene copolymer was evaluated. The results are shown in Table 1.

Examples 8 to 12

Polymerizations were each performed in the same manner as in Example 7 except that the Al/Ti molar ratio and the Si/Al molar ratio were changed, and that the ethylene partial pressure was adjusted so that the ethylene contents in polymers became the values shown in Table 1, thus obtaining propylene-ethylene copolymers, which were then evaluated. The results are shown in Table 1.

Example 13

Polymerization was performed in the same manner as in Example 10 except that diisopropyldimethoxysilane (DIPMS) was used as an external electron donor compound and that the ethylene partial pressure was adjusted, thus obtaining a propylene-ethylene copolymer, which was then evaluated. The results are shown in Table 1.

Example 14

Polymerization was performed in the same manner as in Example 13 except that polymerization was performed by adjusting the ethylene partial pressure without using an external electron donor compound, thus obtaining a propylene-ethylene copolymer, which was then evaluated. The results are shown in Table 1.

Example 15

Polymerization was performed in the same manner as in Example 10 except that the polymerization temperature was 70° C. and the ethylene partial pressure was adjusted, thus obtaining a propylene-ethylene copolymer, which was then evaluated. The results are shown in Table 1.

Example 16

Polymerization was performed in the same manner as in Example 10 except that 100 cc of hydrogen was introduced into the reactor as a chain transfer agent, and that the ethylene partial pressure was adjusted, thus obtaining a propylene-ethylene copolymer, which was then evaluated. The results are shown in Table 1.

Comparative Example 1

A solid catalyst component was prepared by a method described in example 1 of EP 674991 B. The solid catalyst is obtained by supporting diisobutylphthalate as a $TiCl_4$ (titanium tetrachloride) internal electron donor on $MgCl_2$ by a method described in the above patent publication. Polymerization was performed in the same manner as in Example 5 except that the above solid catalyst was used, thus obtaining a propylene homopolymer, which was then evaluated. The results are shown in Table 2.

Comparative Example 2

The solid catalyst prepared in Comparative Example 1, and TEAL and DCPMS were added into the reactor in such amounts that the Al/Ti molar ratio was 150 and the Si/Al molar ratio was 0.15. Similarly to Example 16, 900 cc of hydrogen was introduced into the reactor, and ethylene was continuously supplied during polymerization, thus adjusting the ethylene partial pressure to be constant. A propylene-ethylene copolymer was obtained at a polymerization temperature of 70° C. and a polymerization time of 60 minutes, and evaluated. The results are shown in Table 2.

Comparative Example 3

A solid catalyst component was prepared as follows with reference to a method described in an example of JP 2011-500907 A.

Into a 500 mL 4-necked round-bottom flask purged with nitrogen, 250 mL of titanium tetrachloride was introduced at 0° C. While stirring, 10.0 g of fine spherical $MgCl_2 \cdot 1.8C_2H_5OH$ and 9.1 mmol of diethyl-2,3-(diisopropyl)succinate were added. The fine spherical $MgCl_2 \cdot 1.8C_2H_5OH$ was produced according to a method described in example 2 of U.S. Pat. No. 4,399,054 B but changing the number of revolutions from 10,000 rpm to 3000 rpm.

The temperature in the flask was raised to 100° C. and held for 120 minutes. Stirring was then stopped, the solid product was allowed to settle, and the supernatant liquid was sucked out. Then, the following operation was repeated twice.

Into the flask, 250 mL of fresh titanium tetrachloride was added, the mixture was reacted at 120° C. for 60 minutes, and the supernatant liquid was sucked out. The solid was washed 6 times with anhydrous hexane (6×100 mL) at 60° C.

Polymerization was performed under the same conditions as in Example 5 except that the above-described solid catalyst was used, thus obtaining a propylene homopolymer. The results are shown in Table 2.

Comparative Example 4

A propylene-ethylene copolymer was obtained in the same manner as in Example 10 except that the catalyst prepared in Comparative Example 3 was used, and that the ethylene partial pressure was adjusted so that the ethylene content in the polymer became the value shown in Table 2; and the propylene-ethylene copolymer was evaluated. The results are shown in Table 2.

Comparative Examples 5 to 8

Polymerizations were each performed similarly to Example 1 except that the polymerization conditions were changed as shown in Table 2, thus obtaining propylene homopolymers, which were then evaluated. The results are shown in Table 2.

Comparative Example 9

An autoclave with a stirrer and an internal volume of 6 L was sufficiently vacuum-dried and purged with nitrogen. As a catalyst, 97.8 mg of a titanium trichloride catalyst (manufactured by Tosoh Finechem Corporation) and diethylaluminum chloride (DEAC) as an organoaluminum compound were added in such amounts that the Al/Ti molar ratio was 13. Subsequently, 1.5 kg of propylene was added, the temperature of the autoclave was raised to 60° C., and polymerization was performed at 60° C. for 30 minutes. After completion of the polymerization reaction, the unreacted monomer was purged, and 250 ml of isobutyl alcohol was added to perform deashing treatment at 80° C. for 1 hour. Thereafter, the solid component was allowed to settle, and the supernatant liquid was sucked out. Thereafter, the resultant was washed twice with heptane (300 mL) at 80° C. to obtain 73 g of a propylene homopolymer, which was then evaluated. The results are shown in Table 2.

Comparative Example 10

Polymerization was performed in the same manner as in Comparative Example 9 except that the polymerization temperature was changed to 40° C., thus obtaining a propylene homopolymer, which was then evaluated. The results are shown in Table 2.

TABLE 1

| | | Example | | | |
|---|---|---|---|---|---|
| | | 1 | 2 | 3 | 4 |
| | | Polymer | | | |
| Intrinsic viscosity of polymer | dl/g | 21.1 | 22.5 | 22.7 | 22.2 |
| Content percentage of ethylene-derived units in polymer | wt % | 0.0 | 0.0 | 0.0 | 0.0 |
| XI of polymer | wt % | 98.0 | 97.0 | 95.9 | 97.9 |
| Activity of polymer | g/g-cat/H | 2840 | 1840 | 1000 | 3560 |
| Melting point of polymer | ° C. | 169 | 171 | 172 | 169 |
| Powder fluidity of polymer | — | 1 | 1 | 1 | 1 |
| | Polymerization conditions for polymer | | | | |
| Polymerization temperature | ° C. | 40 | 40 | 40 | 40 |
| Amount of supplied hydrogen | cc | 0 | 0 | 0 | 0 |
| Polymerization time | min | 30 | 30 | 30 | 30 |
| Si/Al | mol/mol | 0.2 | 1.0 | 0.2 | 0.2 |
| Al/Ti | mol/mol | 150 | 503 | 44 | 150 |
| Organoaluminum compound | — | TEAL | TEAL | TEAL | TIBAL |
| Internal electron donor compound | — | Compound a | Compound a | Compound a | Compound a |
| External electron donor compound | — | DCPMS | DCPMS | DCPMS | DCPMS |

| | | Example | | | |
|---|---|---|---|---|---|
| | | 5 | 6 | 7 | 8 |
| | | Polymer | | | |
| Intrinsic viscosity of polymer | dl/g | 21.3 | 20.3 | 26.0 | 27.5 |
| Content percentage of ethylene-derived units in polymer | wt % | 0.0 | 0.0 | 4.2 | 6.6 |

TABLE 1-continued

|  |  |  |  |  |  |
|---|---|---|---|---|---|
| XI of polymer | wt % | 98.1 | 98.2 | 89.9 | 85.6 |
| Activity of polymer | g/g-cat/H | 1000 | 4380 | 3760 | 7040 |
| Melting point of polymer | ° C. | 170 | 168 | 153 | 154 |
| Powder fluidity of polymer | — | 1 | 1 | 1 | 3 |
| Polymerization conditions for polymer | | | | | |
| Polymerization temperature | ° C. | 20 | 50 | 40 | 40 |
| Amount of supplied hydrogen | cc | 0 | 0 | 0 | 0 |
| Polymerization time | min | 30 | 30 | 30 | 30 |
| Si/Al | mol/mol | 1.0 | 1.0 | 0.2 | 0.2 |
| Al/Ti | mol/mol | 150 | 150 | 150 | 57 |
| Organoaluminum compound | — | TEAL | TEAL | TEAL | TEAL |
| Internal electron donor compound | — | Compound a | Compound a | Compound a | Compound a |
| External electron donor compound | — | DCPMS | DCPMS | DCPMS | DCPMS |

|  |  | Example | | | |
|---|---|---|---|---|---|
|  |  | 9 | 10 | 11 | 12 |
| Polymer | | | | | |
| Intrinsic viscosity of polymer | dl/g | 26.5 | 34.0 | 35.1 | 36.9 |
| Content percentage of ethylene-derived units in polymer | wt % | 8.3 | 13.3 | 16.1 | 21.0 |
| XI of polymer | wt % | 77.2 | 74.0 | 56.2 | 57.7 |
| Activity of polymer | g/g-cat/H | 8080 | 14560 | 18740 | 23860 |
| Melting point of polymer | ° C. | 154 | 123 | 134 | 102 |
| Powder fluidity of polymer | — | 2 | 5 | 5 | 5 |
| Polymerization conditions for polymer | | | | | |
| Polymerization temperature | ° C. | 40 | 40 | 40 | 40 |
| Amount of supplied hydrogen | cc | 0 | 0 | 0 | 0 |
| Polymerization time | min | 30 | 30 | 30 | 30 |
| Si/Al | mol/mol | 0.05 | 1.0 | 1.0 | 1.0 |
| Al/Ti | mol/mol | 148 | 150 | 161 | 142 |
| Organoaluminum compound | — | TEAL | TEAL | TEAL | TEAL |
| Internal electron donor compound | — | Compound a | Compound a | Compound a | Compound a |
| External electron donor compound | — | DCPMS | DCPMS | DCPMS | DCPMS |

|  |  | Example | | | |
|---|---|---|---|---|---|
|  |  | 13 | 14 | 15 | 16 |
| Polymer | | | | | |
| Intrinsic viscosity of polymer | dl/g | 28.1 | 22.0 | 21.3 | 21.0 |
| Content percentage of ethylene-derived units in polymer | wt % | 8.8 | 6.4 | 7.8 | 8.2 |
| XI of polymer | wt % | 79.6 | 84.3 | 80.3 | 81.1 |
| Activity of polymer | g/g-cat/H | 14400 | 10200 | 20200 | 23860 |
| Melting point of polymer | ° C. | 152 | 151 | 149 | 151 |
| Powder fluidity of polymer | — | 2 | 2 | 2 | 2 |
| Polymerization conditions for polymer | | | | | |
| Polymerization temperature | ° C. | 40 | 40 | 70 | 40 |
| Amount of supplied hydrogen | cc | 0 | 0 | 0 | 100 |
| Polymerization time | min | 30 | 30 | 30 | 30 |
| Si/Al | mol/mol | 1.0 | 0.0 | 1.0 | 1.0 |
| Al/Ti | mol/mol | 150 | 150 | 150 | 150 |
| Organoaluminum compound | — | TEAL | TEAL | TEAL | TEAL |
| Internal electron donor compound | — | Compound a | Compound a | Compound a | Compound a |
| External electron donor compound | — | DIPMS | None | DCPMS | DCPMS |

TABLE 2

|  |  | Comparative Example | | | | |
|---|---|---|---|---|---|---|
|  |  | 1 | 2 | 3 | 4 | 5 |
| Polymer | | | | | | |
| Intrinsic viscosity of polymer | dl/g | 7.3 | 4.2 | 9.7 | 12.1 | 17.2 |
| Content percentage of ethylene-derived units in polymer | wt % | 0.0 | 5.8 | 0.0 | 8.9 | 0.0 |
| XI of polymer | wt % | 94.1 | 90.4 | 97.7 | 79.2 | 98.4 |

TABLE 2-continued

| | | | | | | |
|---|---|---|---|---|---|---|
| Activity of polymer | g/g-cat/H | 320 | 31800 | 400 | 8980 | 2200 |
| Melting point of polymer | ° C. | 164 | 131 | 166 | 145 | 167 |
| Powder fluidity of polymer | — | 1 | 3 | 1 | 5 | 1 |
| Polymerization conditions for polymer | | | | | | |
| Polymerization temperature | ° C. | 20 | 70 | 20 | 40 | 40 |
| Amount of supplied hydrogen | cc | 0 | 900 | 0 | 0 | 0 |
| Polymerization time | min | 30 | 60 | 30 | 30 | 30 |
| Si/Al | mol/mol | 1.0 | 0.15 | 1.0 | 1.0 | 0.2 |
| Al/Ti | mol/mol | 150 | 150 | 150 | 150 | 1270 |
| Organoaluminum compound | — | TEAL | TEAL | TEAL | TEAL | TEAL |
| Internal electron donor compound | — | Phthalate | Phthalate | Succinate | Succinate | Compound a |
| External electron donor compound | — | DCPMS | DCPMS | DCPMS | DCPMS | DCPMS |

| | | Comparative Example | | | | |
|---|---|---|---|---|---|---|
| | | 6 | 7 | 8 | 9 | 10 |
| Polymer | | | | | | |
| Intrinsic viscosity of polymer | dl/g | 15.5 | 19.3 | 17.0 | 8.8 | 10.7 |
| Content percentage of ethylene-derived units in polymer | wt % | 0.0 | 0.0 | 0.0 | 0.0 | 0.0 |
| XI of polymer | wt % | 98.2 | 98.8 | 95.3 | 94.6 | 96.2 |
| Activity of polymer | g/g-cat/H | 7600 | 840 | 1220 | 1400 | 600 |
| Melting point of polymer | ° C. | 166 | 168 | 164 | 161 | 162 |
| Powder fluidity of polymer | — | 1 | 1 | 1 | 1 | 1 |
| Polymerization conditions for polymer | | | | | | |
| Polymerization temperature | ° C. | 70 | 20 | 20 | 60 | 40 |
| Amount of supplied hydrogen | cc | 0 | 0 | 0 | 0 | 0 |
| Polymerization time | min | 30 | 30 | 30 | 30 | 30 |
| Si/Al | mol/mol | 1.0 | 0.2 | 0 | 0 | 0 |
| Al/Ti | mol/mol | 161 | 150 | 150 | 13 | 13 |
| Organoaluminum compound | — | TEAL | TEAL | TEAL | DEAC | DEAC |
| Internal electron donor compound | — | Compound a | Compound a | Compound a | — | — |
| External electron donor compound | — | DCPMS | DCPMS | None | None | None |

Example 17

1) Polypropylene-Based Resin Composition

The solid catalyst containing the compound a prepared in Example 1 was used to perform polymerization as follows.

[Pre-Stage Polymerization]

The inside of a reactor of an autoclave with a stirrer and an internal volume of 20 L was sufficiently vacuum-dried and replaced with nitrogen. 59.3 mg of the solid catalyst component containing the compound a prepared above was added, and TEAL and DCPMS were also added in such amounts that the Al/Ti molar ratio was 150 and the Si/Al molar ratio was 1.0. Subsequently, 5.6 kg of liquefied propylene was added into the reactor, and polymerization was performed at 40° C. for 10 minutes while ethylene gas was continuously supplied during polymerization, thus adjusting the ethylene partial pressure to be constant. A propylene-ethylene copolymer of the present invention was obtained by adjusting the polymerization pressure. Thereafter, the unreacted monomers were purged, and the inside of the reaction vessel was sufficiently replaced with nitrogen.

[Post-Stage Polymerization]

Subsequently, TEAL and DCPMS were added to the reactor in such amounts that the Al/Ti molar ratio was 400 and the Si/Al molar ratio was 0.05. Into the reactor, 5.6 kg of liquefied propylene and hydrogen gas were added so that the hydrogen concentration in the liquid propylene was 0.7 mol %, the temperature of the autoclave was raised to 70° C., and polymerization (polymerization of propylene) was performed for 180 minutes. After completion of the polymerization reaction, the unreacted monomer was purged to obtain 4.6 kg of a powdery composition. The above composition is a composition obtained by polymerization blending of the propylene-ethylene copolymer of the present invention and polypropylene. The physical properties and the like of the composition are shown in Table 3. However, the intrinsic viscosity, the content percentage of ethylene-derived units, and the melting point of the propylene-ethylene copolymer of the present invention are the results of analyzing a polymer obtained by performing only the pre-stage polymerization under the same conditions. In addition, the proportion of the propylene-ethylene copolymer of the present invention in the composition was determined by the activity ratio with respect to the pre-stage polymerization.

To the composition obtained above, 0.2 phr of B225 manufactured by BASF SE as an antioxidant and 0.1 phr of calcium stearate manufactured by Tannan Kagaku Kogyo Co., Ltd. as a neutralizing agent were added, which was then stirred with a Henschel mixer for 1 minute to obtain a mixture. Subsequently, the mixture was melt-kneaded using an extruder (manufactured by Technovel Corporation, screw diameter: 15 mm, co-rotating twin screw extruder) having a screw temperature set to 230° C. Then, the melted mixture was discharged from the extruder, cooled to form strands, which were then cut to obtain a pellet-shaped polypropylene-based resin composition.

2) Formation of Foam

To the polypropylene-based resin composition obtained as described above, 4 phr of CELLMIC MB3064 manufactured by Sankyo Kasei Co., Ltd. was added as a foaming agent, which was then dry-blended to obtain a foamable composition. Subsequently, using the foamable composition, foamed strands were formed under the following conditions, and the foam obtained was evaluated.

Extruder: single screw extruder TP-15 manufactured by Thermo Plastics Industries, Co., Ltd.
Die portion shape: strand die
Die portion dimension: 2 mmφ
Extrusion amount: 500 g/h
Screw shape: full flight screw
Screw rotation speed: 40 rpm
Cylinder set temperature: 210° C.
Die portion set temperature: 180° C.

To the polypropylene-based resin composition similarly obtained in 1), 6 phr of CELLMIC MB3064 manufactured by Sankyo Kasei Co., Ltd. was added as a foaming agent, which was then dry-blended to obtain a foamable composition. Using the foamable composition, a foam was obtained and evaluated as described above.

A polypropylene-based resin composition similarly obtained in 1) was hot press-molded at a temperature of 230° C. to obtain a non-foamed sheet (thickness: 500 μm). This non-foamed sheet was cut to prepare a test piece, and the stiffness was measured. These results are shown in Table 3.

TABLE 3

|  |  |  | Example 17 |
|---|---|---|---|
| Foam | Foaming ratio | Foaming agent (4 phr) | 2.9 |
|  |  | Foaming agent (6 phr) | 3.6 |
|  | Appearance | — | B |
|  | Closed cell property | — | B |
| Non-foamed sheet | Stiffness | MPa | 1450 |
| Copolymer of the present invention | Content in composition | wt % | 3.1 |
|  | Intrinsic viscosity | dl/g | 28 |
|  | Content percentage of ethylene-derived units | wt % | 6.6 |
|  | Melting point | ° C. | 154 |
| Polypropylene | MFR | g/10 min | 18 |
|  | Content percentage of ethylene-derived units | wt % | 0 |
| Composition of copolymer of the present invention and polypropylene | MFR | g/10 min | 2.6 |
|  | Melt tension | g-weight | 7.9 |
|  | XI | wt % | 99.0 |

The evaluation was carried out as follows.

[Content Percentage of Ethylene-Derived Units]

A propylene (co)polymer sample was hot-pressed at 230° C. to prepare a sheet having a thickness of 0.4 mm. By Fourier transform infrared spectroscopy (FT-IR), an IR absorption spectrum of the sample to air background was collected to determine the content percentage (wt %) of the ethylene-derived units of the propylene (co)polymer using a peak area of 760 cm to 690 cm$^{-1}$ after correcting the thickness of the sheet. The data collection parameters were as follows.

Apodization: Cosine
Resolution: 2 cm$^{-1}$

[XI of Polymer]

While stirring, 0.1 to 0.5 g of a polymer was dissolved in 250 mL of xylene at 135° C. After 30 min, the solution was cooled to 25° C. while stirring and then allowed to stand for 30 min. The precipitate was filtered through filter paper, the solution was evaporated in a stream of nitrogen, and then the residue was dried at 80° C. under vacuum until the residue gained a constant weight. The wt % of the polymer soluble in xylene at 25° C. was thus calculated. The amount of a xylene insoluble component (wt % of polymer insoluble in xylene at 25° C., XI) is determined by 100-"wt % of soluble polymer" and is considered to be the amount of a crystalline component in the polymer.

[Intrinsic Viscosity of Polymer]

A sample of a propylene (co)polymer was dissolved in tetralin at 135° C. to obtain a solution having a concentration of 0.01 wt %. Using the solution, the intrinsic viscosity was measured using a capillary automatic viscosity measuring apparatus (SS-780-H$_1$, manufactured by Shibayama Scientific Co., Ltd.).

[Powder Fluidity]

A metal frame having an opening of 5 cm long×5 cm wide×1 cm high was placed on a metal plate, and 5 g of a polymer was spread as a sample within the metal frame. A 0.92 g metal lid was placed on the metal frame so that the pressure applied to the sample was uniformly 23 g/cm$^2$. The sample within the metal frame was held at 70° C. for 20 minutes, then the metal frame and the metal lid were removed, and the metal plate with the sample placed thereon was inclined, whereby the following 5-grade evaluation was performed 4 times, and the average value was calculated.

1. When inclined to 0° or more and less than 30°, the whole amount collapses.
2. When inclined to 30° or more and less than 50°, the whole amount collapses.
3. When inclined to 50° or more and less than 70°, the whole amount collapses.
4. When inclined to 70° or more and less than 90°, the whole amount collapses.
5. The whole amount does not collapse even when inclined to 90° or more.

The material of the metal plate, the metal frame, and the metal lid was SUS304 stainless steel, and as the metal plate, a metal plate having a surface roughness (maximum roughness, Ry) of 0.2 μm obtained by #400 polishing (sisal finishing) of the surface was used.

[Melting Point of Polymer]

The melting point of a polymer was measured by second scanning defined as described above using a Diamond DSC manufactured by PerkinElmer, Inc.

[MFR]

The MFR was measured in accordance with JIS K7210-1 under conditions of a temperature of 230° C. and a load of 2.16 kg.

[Melt Tension]

Using a capillary rheometer (Capilograph 1D manufactured by Toyo Seiki Seisaku-sho, Ltd.) equipped with a cylindrical orifice having a length of 8.0 mm and a diameter of 2.095 mm and having a flat upper surface, a resin composition was melted at a temperature of 200° C. The melted resin composition was discharged from the orifice at a resin extrusion rate of 15 mm/min to form a strand. The strand was taken up using a rotating take-up device at a take-up speed of 6.5 m/min while the melt tension (unit: g-weight) was measured.

[Appearance of Foam]

The appearance of a foamed strand that had been foamed at a foaming ratio of 3.0 or more and 3.4 or less was evaluated according to the following criteria.

A: The surface is smooth, and a strand is straight.
B: The surface is slightly uneven or wavy.
C: The surface is uneven, and a strand has waviness.

[Closed Cell Property]

A foamed strand that had been foamed at a foaming ratio of 3.0 or more and 3.4 or less was cut out to a piece having a length of 4 cm with a razor blade, one side of the piece was immersed in an ethanol solution of a pigment for 30 seconds, and the closed cell property was evaluated from a distance (coloring maximum distance) at which ethanol most penetrated the inside from the cut section.

A: Coloring maximum distance is 2 mm or less.
B: Coloring maximum distance is more than 2 mm and 20 mm or less.
C: Coloring maximum distance is more than 20 mm.

[Stiffness]

A non-foamed sheet was punched into a test piece having a length of 2.75 inches and a width of 1.5 inches to prepare five test pieces.

The stiffness of each test piece was measured according to JIS P8125 using V-5 stiffness tester (model: 150-B) manufactured by Taber Instrument Corporation at a room temperature of 23° C. The measurement conditions for the measurement were as follows.

Measurement range: 50-500
Range weight: 500 units
Warpage angle: 15°
Measurement span: 5 cm
Scale magnification: 5-fold
Retention time: 1 minute
Measurement temperature: 23° C.

The stiffness was determined by reading values at right and left warpage angles of 15° for each test piece and averaging the values. Then, the stiffness of the non-foamed sheet was determined by the following formula.

$$E = 9.83 \times T_{su}/t^3$$

(E: stiffness of sheet [MPa], $T_{su}$: average value of stiffness [gf cm], t: thickness of test piece [mm])

As the stiffness value is larger, the rigidity is higher.

It is apparent that, in the cases of the same content percentages of ethylene-derived units in polymers, the propylene-ethylene copolymers of Examples, which have a intrinsic viscosity of more than 20 dl/g, are excellent in powder fluidity compared with the propylene-ethylene copolymers of Comparative Examples, which have a intrinsic viscosity of 20 dl/g or less. It is also apparent that the non-foamed sheet and the foams obtained from the composition containing the propylene (co)polymer of the present invention have excellent properties.

The invention claimed is:

1. A copolymer of propylene and a 30 wt % or less α-olefin having 2 or 4 to 8 carbon atoms, the copolymer having an intrinsic viscosity of more than 20 dl/g, as measured in a tetralin solvent at 135° C.

2. The copolymer according to claim 1, wherein the α-olefin is ethylene.

3. The copolymer according to claim 2, the copolymer having a value of the intrinsic viscosity of 23 dl/g or more and a content of the ethylene of 3 to 30 wt %.

4. The copolymer according to claim 2, the copolymer having a melting point determined using a differential scanning calorimeter (DSC) at a heating rate of 10° C./min, wherein the melting point, Tm (° C.), of the copolymer and the content of the ethylene in the copolymer, C2 (wt %), satisfy formula (1) below:

$$Tm \geq -3.4 \times C2 + 162 \quad (1).$$

5. A method for producing the copolymer according to claim 1, comprising the polymerization of flail corresponding monomers using a catalyst to prepare the copolymer, wherein the catalyst contains:
(A) a solid catalyst containing magnesium, titanium, halogen, and an electron donor compound as essential components;
(B) an organoaluminum compound; and
(C) an external electron donor compound as necessary.

6. A polypropylene-based resin composition comprising the copolymer according to claim 1, wherein
a content of the copolymer is 0.1 to 20 wt % with respect to a total weight of resin components constituting the composition.

* * * * *

UNITED STATES PATENT AND TRADEMARK OFFICE
CERTIFICATE OF CORRECTION

| | | |
|---|---|---|
| PATENT NO. | : 11,787,882 B2 | Page 1 of 1 |
| APPLICATION NO. | : 17/619387 | |
| DATED | : October 17, 2023 | |
| INVENTOR(S) | : Akihiro Otsubo et al. | |

It is certified that error appears in the above-identified patent and that said Letters Patent is hereby corrected as shown below:

On the Title Page

Item (73), Assignee, change "RESONAC CORPORATION" to – SunAllomer Ltd., RESONAC CORPORATION Tokyo, Japan –

Signed and Sealed this
Seventeenth Day of June, 2025

Coke Morgan Stewart
*Acting Director of the United States Patent and Trademark Office*